Nov. 4, 1952     G. G. BARR     2,616,724
FENDER WELT
Filed July 21, 1950
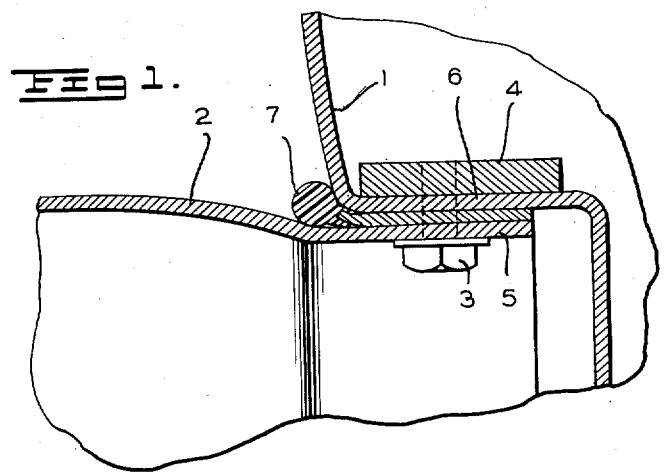
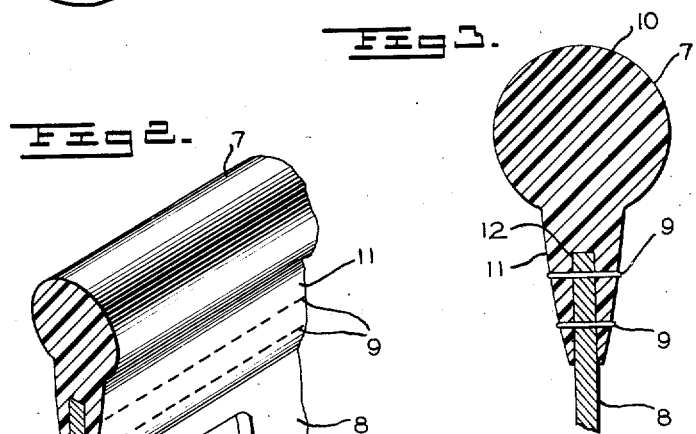
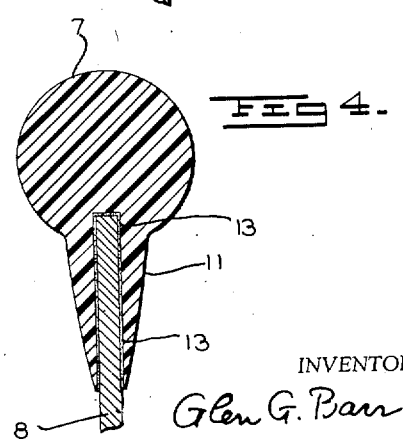
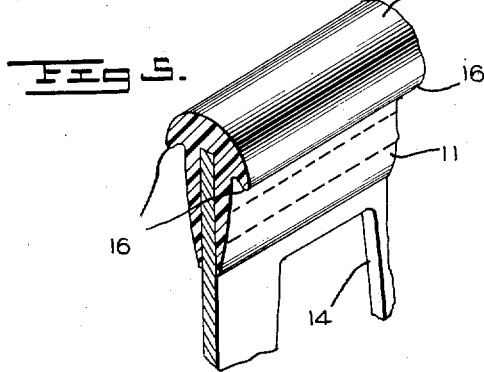
INVENTOR
Glen G. Barr
BY Albert H. Kirchner
ATTORNEY

UNITED STATES PATENT OFFICE 2,616,724

FENDER WELT

Glen G. Barr, Union City, Ind., assignor to Backstay Welt Company, Union City, Ind., a corporation of Indiana Application July 21, 1950, Serial No. 175,207

5 Claims. (Cl. 280—153.5)

The present invention relates to fender welts and analogous strip materials.

Fender welts are trimming elements which are provided in strip form for interposition between the juxtaposed sheet metal surfaces of automobile bodies and fenders. Their purpose is primarily to prevent squeaking, rattling, etc. of the metal parts, to insulate their contact and cushion their engagement, to prevent ingress of water, dust and the like between them, to perform a somewhat soft, compressible gasket function so as to increase the security and permanence of the clamping action of the bolts or the like which hold the metal surfaces together, and to trim the fit of the metal parts.

To accomplish the foregoing objects fender welts are generally provided along one side with a beaded edge which projects slightly from the converging surfaces of the body and fender areas and fills the pocket or joint at which these areas exteriorly diverge, and they include also a flat, somewhat soft strip of material extending from the beaded edge for reception between, and clamped interposition with, the interior, unexposed areas of body and fender metal which are bolted or otherwise secured together.

It has been customary to make fender welts from a composite of folded strips of textile material, with a filler extending along the edge that is to be exposed so as to thicken that edge to provide the bead, and with a flat sheet of more or less similar material stitched or cemented to the beading for clamping by the fender-attaching bolts. Various arrangements have been proposed to reduce cost and improve efficiency, and the principal objects of the present invention are to provide new arrangements, relationships and materials to further reduce cost and improve efficiency.

To this end the invention has for its more specific objects the provision of a fender welt structure which eliminates the use of bead-covering fabric and reduces the number of components of the welt to a minimum.

A related object is to employ materials for the beaded edge and securing web respectively which are superior in their capacity to perform their respective functions of trimming, joint-closing, weather resistance and ornamentation for the bead, and secure attachment to the bead and to the metal surfaces for the web.

A still further object is to minimize cost by employing inexpensive materials, inexpensively manufactured and united.

Certain specific forms of embodiment of the invention which have been thoroughly tested in actual practice and found to give satisfaction, and which are therefore at present preferred by me, are used in the present specification to explain the principles of the invention.

These embodiments are illustrated in the accompanying drawing, in which

Figure 1 is a sectional view taken through a portion of an automobile body and its attached fender showing the new fender welt in operative position;

Fig. 2 is a perspective view of a short length of fender welt constituting one of the preferred embodiments;

Fig. 3 is a cross sectional view of the same welt;

Fig. 4 is a cross sectional view of a modified embodiment; and

Fig. 5 is a perspective view of a still further modified embodiment.

In these figures, the reference numeral 1 designates a portion of an automobile body in the region at which a fender 2 is attached as by means of bolts 3 threaded into a nut or backing plate 4. The arrangement is typical of all presently used relationships of body and fender metal, however formed or related by any kind of clamping means. In all such cases complementary areas of sheet metal surfaces 5 and 6 are juxtaposed and firmly secured together, with a strip of fender welt material intervening.

The present fender welt comprises the combination of a bead element 7 and an attaching web, skirt or flange 8 extending from one side of the bead element. The structure includes no additional parts or elements, with the single exception of stitching 9 or adhesive material used for firmly and permanently securing the bead element and web together.

The bead element is made of a solid body of molded or extruded rubber, rubber composition, or plastic which is flexible enough to be bent or curved in any direction to conform to the curvature of the body-fender joint which is to be trimmed.

This welt body is, in the embodiments of the invention shown in Figs. 1–3 and 4, made solid and includes an outermost portion having a partly cylindrical surface 10 from which there extends along one side a more or less flat but generally tapering or feathered integral projection or flange 11. This projection is deeply slotted along its median plane, as shown at 12, and into this slot is seated, in a comparatively snug fit, one edge margin of the web, skirt or flange 8. The two are bonded together permanently and securely by means of the stitching 9, here shown as provided in two parallel longitudinal lines, or by a coating of adhesive 13, as shown in Fig. 4, or by both stitching and adhesive. Where adhesive alone is relied upon, the slot 12 may be made deeper to provide adhesive-receiving contact areas of increased extent, as shown in Fig. 4.

The web is made of inexpensive sheet material which may comprise a textile fabric of adequate body, softness and strength, or it may consist of fairly heavy paper stock. A textile material which I prefer to use consists of woven spun glass fibers, commercially known as "glass cloth," which has been heavily impregnated with an asphaltic composition. I have also used with success heavy coarse paper stock similarly impregnated and coated.

The web 8 is best notched deeply at intervals along its length with openings 14 extending inwardly from its free edges. These openings facilitate bending in the plane of the web, and they accommodate the bolts and other fastening means 3 which of course must penetrate the web.

The bead element 15 of the embodiment shown in Fig. 5 differs from the bead elements of the other figures by comprising an outermost surface which is semi-cylindrical, or slightly more than semi-cylindrical, terminating at its two opposite edges in free flanges 16 each of which has a slightly undercut merger with the tapering projection 11. These edge flanges, being comparatively thin and being formed of the same flexible material as the rest of the bead element, make intimate, snug contact with the exterior surfaces of the body and fender metal along lines close to the vertex at which they converge or from which they diverge, and this embodiment of the invention is therefore preferred for use in certain installations where the curvature of the joint is such that increased flexibility of the trimming portion of the welt is desirable to facilitate conforming the welt to such curvature.

In both cases, however, the surfaces of the beading element are found to make tight engagement and good conforming contact with the metal of the parts 1 and 2, effectively preventing ingress of water, grit and the like to the space between the surfaces 5 and 6, so that these surfaces are maintained protected in their well cushioned relationship by the soft sheet material of the web.

The tapering projection 11 well fits and conforms to the tapering space between the body and fender metal by which they merge into the parallel surfaces 5 and 6 to form the space which is filled by the web 8.

It will be noted that, as best shown in Fig. 1, the comparatively expensive material of the bead element 7 or 15 is confined almost entirely to that portion of the welt which is exposed to view and to the weather and to abrasive and other injurious influences, while the protected, concealed portion of the welt is made up entirely of the inexpensive material of the web 8.

The solid body material of the bead element excellently resists weathering and abrasion and is practically unchanged in appearance even if scratched or cut to expose any of its interior.

One of the important advantages of the new type of construction is indicated in Fig. 1 where, it will be noted, the inwardly tapering pocket defined by the inwardly converging surfaces of the body 1 and fender 2 is well filled by the tapering projection 11. This snug fit and complete filling, along zones of substantial width instead of along lines merely, is made possible because the projection 11 can be, and preferably of course is, preformed to conform to the shape of the pocket into which it is intended to fit. The welt as a whole is somewhat distorted, when in operative position, by being bent transversely. This bending produces an upper decidedly concave curvature which well fits the correspondingly convex curvature of the body metal 1, and it produces a much shallower concavity, amounting almost to a straight flat plane at the bottom of the welt, which conforms well with the flat or nearly flat surface of the fender 2. To accommodate the welt to special installations having body and fender surfaces presenting different curvatures from those of the typical structure shown in Fig. 1, the projection 11 can be differently shaped by appropriately modifying the mold or extrusion die used in making it. These advantages are inherent in the present use of a molded or extruded body for the bead and its integral projection, and are not attainable by the use of the standard fully cylindrical beading which in the best prior art was wrapped in covering fabric that extended diametrically from the beading to provide a plain flat web or skirt.

I claim:

1. A fender welt comprising a beading strip of solid flexible material having along one edge a partly cylindrical longitudinal edge bead enlargement merging into an integral tapering projection adapted to lie snugly in the exterior angle between an automobile body and fender and having a slot entering said projection from its edge opposite the bead enlargement and a web of thin sheet material having one longitudinal margin secured in said slot with the major portion of the web projecting from the beading strip and adapted to be clamped between said body and fender.

2. A fender welt as claimed in claim 1, in which the web is of fibrous material impregnated with an asphaltic composition.

3. A fender welt as claimed in claim 1, in which the web is secured in the slot by a line of stitching penetrating the portions of the beading strip which define the slot.

4. A fender welt as claimed in claim 1, in which the web is of fibrous material impregnated with an asphaltic composition and is secured in the slot by a line of stitching penetrating the portions of the beading strip which define the slot.

5. A fender welt as claimed in claim 1, in which the bead enlargement is approximately half-cylindrical and terminates in a pair of flanges which make undercut merger with the slotted projection whereby the free edges of the flanges are adapted to make snug line contact with the body and fender respectively.

GLEN G. BARR.

REFERENCES CITED

The following references are of record in the file of this patent:

UNITED STATES PATENTS

| Number | Name | Date |
| --- | --- | --- |
| 1,832,122 | Holbrook et al. | Nov. 17, 1931 |
| 2,070,373 | Schwab | Feb. 9, 1937 |
| 2,105,397 | Barr et al. | Jan. 11, 1938 |
| 2,234,121 | Hedeen | Mar. 4, 1941 |
| 2,347,159 | Spraragen | Apr. 18, 1944 |
| 2,416,798 | Ferguson | Mar. 4, 1947 |